(12) United States Patent
Gulick

(10) Patent No.: US 6,336,179 B1
(45) Date of Patent: *Jan. 1, 2002

(54) DYNAMIC SCHEDULING MECHANISM FOR AN ASYNCHRONOUS/ISOCHRONOUS INTEGRATED CIRCUIT INTERCONNECT BUS

(75) Inventor: Dale E. Gulick, Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,345

(22) Filed: Aug. 21, 1998

(51) Int. Cl.⁷ ............................................... G06F 15/00
(52) U.S. Cl. ................................ 712/32; 712/6; 712/7; 709/232; 709/233; 709/236; 709/238
(58) Field of Search .............................. 712/2, 3, 4, 25, 712/26, 200, 32, 204, 22, 21, 6, 7; 709/232, 233, 236, 238

(56) References Cited

U.S. PATENT DOCUMENTS

| | | | | |
|---|---|---|---|---|
| 5,329,531 A | * | 7/1994 | Diepstraten et al. | 370/347 |
| 5,422,883 A | | 6/1995 | Hauris et al. | 370/62 |
| 5,450,411 A | | 9/1995 | Heil | 370/94.2 |
| 5,487,170 A | * | 1/1996 | Bass et al. | 710/244 |
| 5,570,201 A | * | 10/1996 | Yokota | 358/404 |
| 5,604,742 A | * | 2/1997 | Colmant et al. | 370/396 |
| 5,621,898 A | | 4/1997 | Wooten | 395/297 |
| 5,640,392 A | | 6/1997 | Hayashi | 370/395 |
| 5,742,847 A | | 4/1998 | Knoll et al. | 395/866 |
| 5,758,105 A | | 5/1998 | Kelley et al. | 395/293 |
| 5,761,430 A | | 6/1998 | Gross et al. | 395/200.55 |
| 5,761,431 A | * | 6/1998 | Gross et al. | 709/225 |
| 5,761,448 A | | 6/1998 | Adamson et al. | 395/284 |
| 5,845,152 A | * | 12/1998 | Anderson et al. | 710/52 |
| 5,872,998 A | | 2/1999 | Chee | 395/876 |
| 5,948,080 A | | 9/1999 | Baker | 710/37 |
| 5,991,304 A | * | 11/1999 | Abramson | 370/413 |
| 6,032,211 A | * | 2/2000 | Hewitt | 710/107 |
| 6,061,411 A | * | 5/2000 | Wooten | 375/372 |

* cited by examiner

Primary Examiner—Daniel H. Pan
Assistant Examiner—Dzung C. Nguyen
(74) Attorney, Agent, or Firm—Zagorin, O'Brien & Graham, LLP

(57) ABSTRACT

A first counter sequentially counts a plurality of numbers from respective sources requesting transfer of data. Each of the numbers represents an amount of isochronous data to transfer over the bus from the respective ones of the sources during a frame on a bus. A count value in a second counter is selectably incremented when the first counter is counting, to provide a remaining count value indicative a remaining amount of data to transfer during the frame. The remaining count value in the second counter is decremented for each isochronous transfer on the bus after the remaining amount of data to transfer has been determined from all sources requesting transfer of isochronous data during the frame. A third counter tracks the time remaining in the frame and compares the remaining count value to the time remaining in the frame to determine a priority mode on the bus. The bus switches to isochronous priority mode on the bus according to a comparison of the remaining count value and the time remaining in the time period.

17 Claims, 5 Drawing Sheets

DYNAMIC SCHEDULING MECHANISM FOR AN ASYNCHRONOUS/ISOCHRONOUS INTEGRATED CIRCUIT INTERCONNECT BUS

RELATED APPLICATIONS

This application relates to application Ser. No. 09/099,227, filed Jun. 17, 1998, entitled METHOD OF MODE CONTROL IN A BUS OPTIMIZED FOR PERSONAL COMPUTER TRAFFIC, by Larry Hewitt now U.S. Pat. No. 6,032,211; application Ser. No. 09/098,874, filed Jun. 17, 1998, entitled BUS OPTIMIZED FOR PERSONAL COMPUTER TRAFFIC, by Larry Hewitt and Dale E. Gulick now U.S. Pat. No. 5,982,550; application Ser. No. 09/098,360 filed Jun. 17, 1998, entitled COMPUTER WITH HIGH VELOCITY-LOW PIN COUNT NORTH BRIDGE SOUTH BRIDGE LINK, by Larry Hewitt and Dale E. Gulick U.S. Pat. No. 6,151,651; co-pending application Ser. No. 09/098,228 filed Jun. 17, 1998, entitled CPU-NORTH BRIDGE INTEGRATION UTILIZING AN INTERCONNECTION BUS PROVIDING A HIGH SPEED-LOW PIN COUNT LINK by Dale E. Gulick and Larry Hewitt, which applications are incorporated herein by reference.

BACKGROUND OF THE INVENTION

1. Field of the Invention

The invention relates to computer systems and more particularly to efficiently scheduling transfers on a computer system bus having a relatively high bandwidth and a relatively low pin count.

2. Description of the Related Art

In current and future personal computer systems, two basic types of data are transferred between integrated circuits: isochronous data and asynchronous data. Isochronous data refers to data used in real-time data streams such as audio data or motion-picture video data. Asynchronous data is used for all other transfers, such as central processing unit (CPU) accesses to peripherals or bulk data transmissions from a hard drive into system memory.

At present, buses in computer systems provide inadequate support for transfer of both isochronous and asynchronous data on the same bus. For example, the peripheral component interface (PCI) bus, a major input/output bus in present personal computer architectures, does not support isochronous data. If a computer system gives asynchronous data priority or treats isochronous data as asynchronous data, then those functions relying on real time data, such as motion-picture video, may not function satisfactorily. Alternatively, if a computer system prioritizes isochronous data, then the performance of the computer system can suffer since the latency of asynchronous data can become unacceptably long. As computer systems are called on to perform more and more real time activity, such as real time video, it becomes more critical that asynchronous and isochronous data be treated in a manner that prevents problems from occurring in the real time tasks without adversely effecting other aspects of computer performance. Thus, there exists a need to appropriately accommodate both kinds of data in present and future computer systems without adversely affecting system performance.

SUMMARY OF THE INVENTION

Accordingly, the invention provides a method and apparatus to dynamically schedule isochronous transfers on an interconnect bus. In accordance with one aspect of the invention, an apparatus determines priority of data transfer over a bus transferring asynchronous and isochronous data. The apparatus includes a plurality of sources that provide transfer count values indicative of an amount of isochronous data to transfer over the bus during a specific time period from the respective sources. A selector circuit is coupled to the sources and selectably provides one of the count values to a down counter. The down counter sequentially loads count values from the sources requesting transfer of isochronous data during the time period. The apparatus further includes an up/down counter and a control circuit coupled to the down counter and the up/down counter and the selector circuit. The control circuit configures the up/down counter to count up while the down counter is counting, thereby providing a remaining count value indicative of a remaining amount of isochronous data requested to be transferred during the time period from the plurality of sources requesting transfer of isochronous data.

In accordance with another aspect of the invention, a method for determining an amount of data to transfer over a bus from a plurality of sources during a time period, includes sequentially providing a plurality of numbers to a first counter from respective ones of the sources requesting transfer of data. Each of the numbers represents an amount of data to transfer over the bus from the respective sources. The first counter sequentially counts the plurality of numbers. A count value in a second counter is selectably incremented when the first counter is counting, to provide a remaining count value indicative of a remaining amount of data to transfer in the time period from the plurality of sources requesting transfer of data during the time period. The plurality of sources provide isochronous data and the method further includes decrementing the remaining count value in the second counter for each isochronous transfer on the bus after the remaining amount of data to transfer has been determined from all sources requesting transfer. The method also includes tracking the time remaining in the time period in a third counter and comparing the remaining count value to the time remaining in the time period to determine a priority mode on the bus. The bus switches to isochronous priority mode according to a comparison of the remaining count value and the time remaining in the time period.

BRIEF DESCRIPTION OF THE DRAWINGS

The present invention may be better understood, and its numerous objects, features, and advantages made apparent to those skilled in the art by referencing the accompanying drawings in which the use of the same reference symbols in different drawings indicates similar or identical items.

DESCRIPTION OF THE PREFERRED EMBODIMENT(S)

In an exemplary system in which the present invention is utilized, as described more fully in application Ser. No. 09/098,874, entitled BUS OPTIMIZED FOR PERSONAL COMPUTER TRAFFIC, incorporated by reference above, isochronous data and asynchronous data are transferred over a bus in a personal computer system. The bus transfers data in frames of a predetermined length. Isochronous data is guaranteed a specified amount of bandwidth and worst-case latency during each frame on the bus. For example, the bus may guarantee that up to 30% of the frame can be utilized for isochronous transfers. Initially during the frame, asynchronous transfers are granted priority over isochronous transfers (to minimize the latency of the asynchronous transfers), and thus the bus is in asynchronous priority mode. According to the bus protocol, each interface on the bus tracks the amount of isochronous data transmitted and the bus switches to isochronous priority mode only if necessary to guarantee a predetermined isochronous bandwidth for the frame. If the bus switches to isochronous priority mode, the bus, stays in isochronous priority mode until all isochronous transfers are complete.

Figure 1:
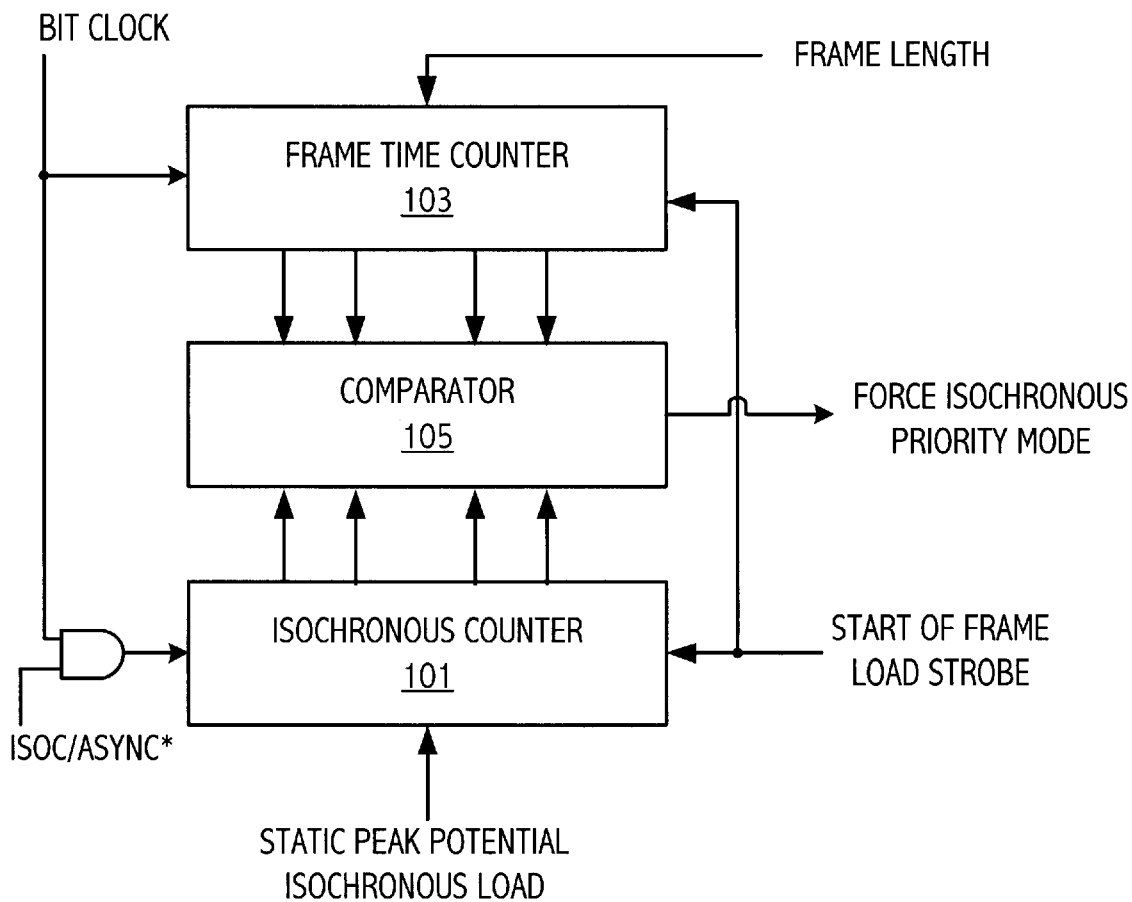
FIG. 1 illustrates a static scheduling mechanism to determine whether to enter isochronous priority mode in which a static maximum isochronous load value is used.

In one embodiment of the computer system using the bus described above, the control structure uses static scheduling to determine when to enter isochronous mode. Referring to FIG. 1, at the start of every frame, the system loads isochronous counter 101, with a predetermined value which may be calculated in software at system configuration time by adding up all of the potential isochronous loads. That predetermined value represents the peak potential isochronous load instead of the actual load for each frame.

At the beginning of each frame, frame time counter 103 is loaded with the total number of bit times in the frame. Each bit time represents a time period on the bus in which one bit of asynchronous or isochronous data may be transferred on one data line. The number of bits transferred on the bus per bit time depends on the number of data lines on the bus and may be a single bit, a byte or multiple bytes according to the number of data lines on the bus. For instance, each clock edge on the bus may be used to transfer data, which would result in two bit times for each bus clock period. Thus, for a 400 MHz bus clock, there would be 800 M bit times each second and 1600 bit times in a two-microsecond frame.

During each frame, counter 103 is decremented each bit time and compared to isochronous counter 101 in comparator 105. During the frame, isochronous counter 101 is decremented for each actual isochronous transfer. Although the bus starts in asynchronous priority mode, note that isochronous data may be transferred when the bus is in asynchronous priority mode if there is no asynchronous data to transfer. Therefore counter 101 may be decremented even during asynchronous priority mode. If the two counters ever cross, as determined by comparator 105, that crossing indicates that the remainder of the frame may be required to be allocated to isochronous transfers to ensure that the peak potential isochronous load is handled, and therefore forces isochronous priority mode. Note that if no sources are requesting transfer of isochronous data at that time, the bus does not need to switch to isochronous priority mode.

The use of a static value for the amount of isochronous data to transfer during the frame reduces hardware complexity because there is no need to add the transfer requests from the various requesters. However, that simplification results in the bus tending to enter isochronous priority mode earlier than necessary for a typical frame since the isochronous counter is loaded with the maximum possible load rather than the actual isochronous data to transfer for the frame. It is anticipated that the actual load value will typically be less than maximum.

Figure 2:
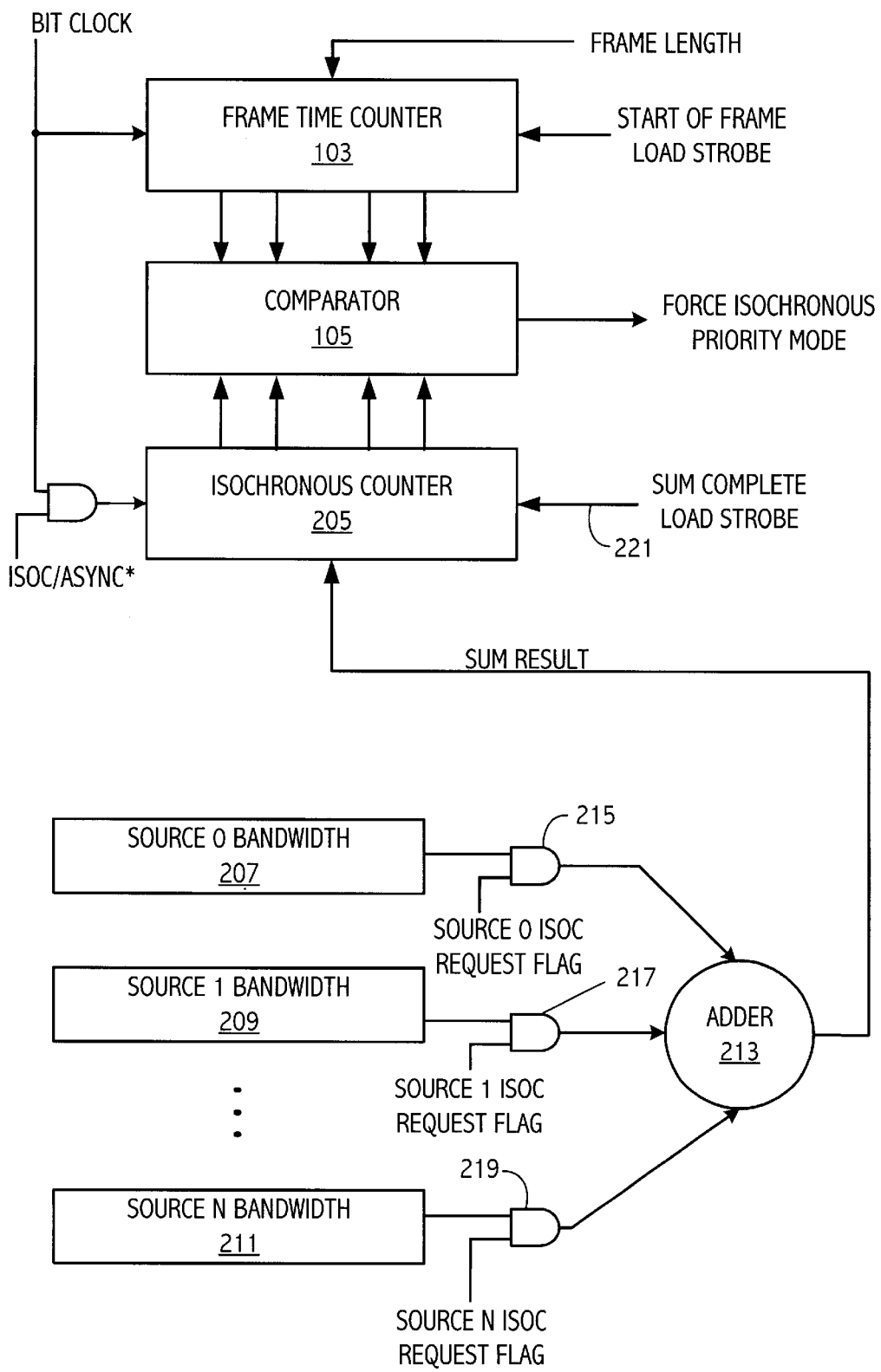
FIG. 2 illustrates a first dynamic scheduling approach in which the actual amount of data to be transferred from each of the isochronous requesters is added together at the start of the frame.

Alternatively, the isochronous load can be calculated on a frame by frame basis. Assume that all isochronous sources that have data to be sent during a given frame must indicate that need by, e.g., asserting an isochronous transfer request flag at the start of the frame. Referring to FIG. 2, isochronous bandwidth registers 207–211 provide bandwidth requests for each frame from the corresponding isochronous requester to ADDER 213 through AND gates 215–219. Each isochronous requester also respectively provides AND gates 215–219 with their request flag. The request flag gates off pipe bandwidth data from any source not requesting isochronous data transfers during that frame. At the start of the frame, ADDER 213 sums the isochronous bandwidth requests and provides a dynamically determined load value for that frame to isochronous counter 205. Note that the load strobe 221 for isochronous counter 205 occurs after the sum from ADDER 213 is available. Thus, the comparison between isochronous counter 205 and frame time counter 103 provides an accurate frame by frame comparison for determining isochronous priority mode. That can cause the bus to enter isochronous priority mode later in the frame as compared to the static approach, thus reducing the latency for asynchronous transfers.

Dynamic scheduling clearly offers certain advantages relative to static scheduling. However, loading the isochronous counter with a newly calculated value each frame can require additional hardware to add up each isochronous source's required bandwidth. For example, a two-microsecond frame rate is most likely too fast to use a host central processing unit (CPU) to perform the calculation without adversely impacting CPU performance. In addition, there may be no other available adder circuits to utilize. Thus, the cost of implementing dynamic scheduling may be high in certain applications.

Figure 3:
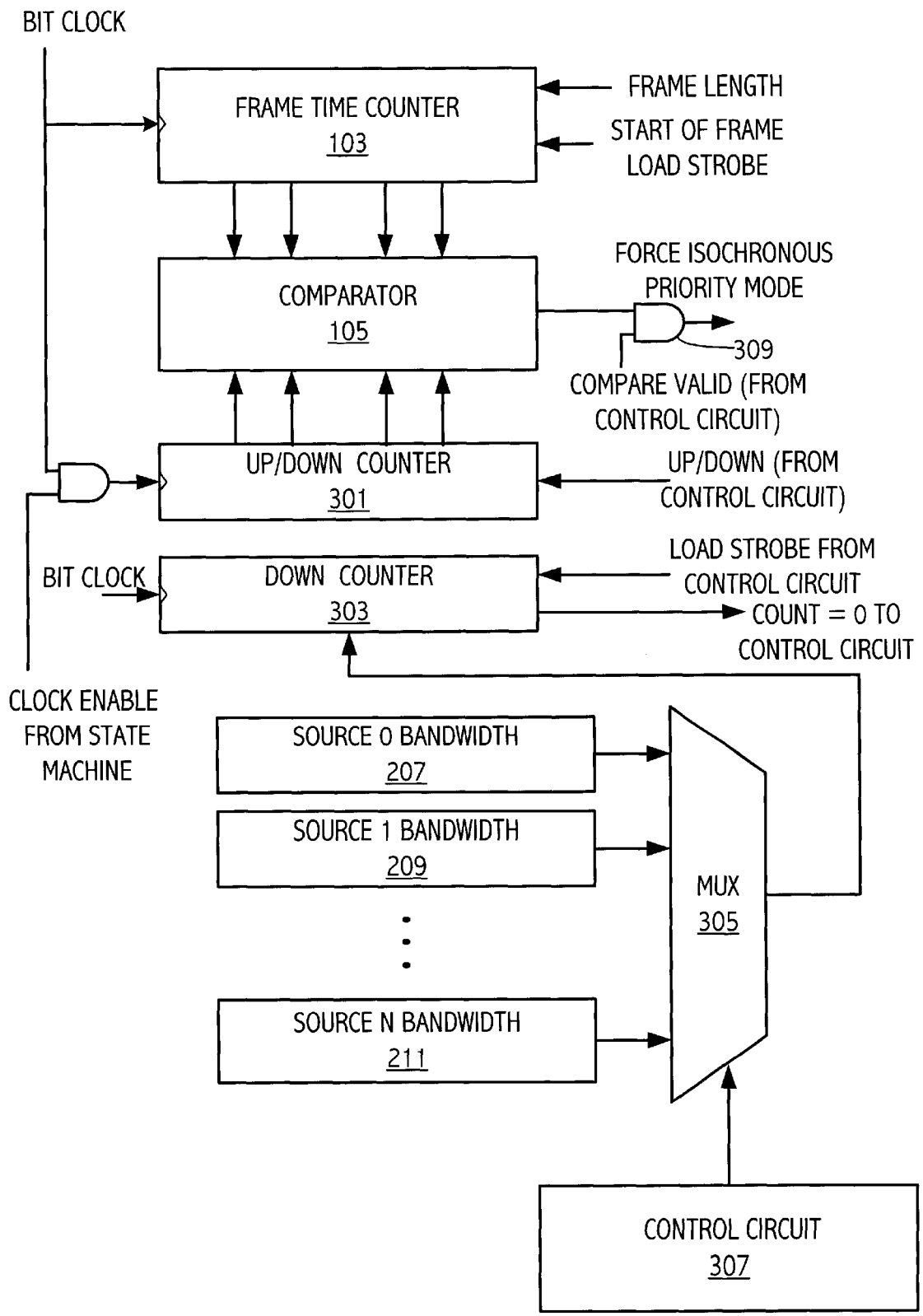
FIG. 3 illustrates a second dynamic scheduling approach in which the amount of data to be transferred from each of the isochronous requesters is sequentially added in a first counter while a second counter determines a sum of isochronous data from the individual requester(s), to be transferred during the frame.

Referring to FIG. 3, another embodiment of dynamic scheduling is shown that eliminates the adder hardware utilized in the embodiment shown in FIG. 2. Rather than use the ADDER, a counter can be used to sequentially add bandwidth requirements for the frame from all the requesting isochronous sources. Each isochronous source provides its bandwidth requirements to multiplexer 305 through bandwidth request registers 207–211. Multiplexer 305 is controlled by control circuit 307 which receives the request flags (not shown) from the isochronous sources to appropriately select the transfer count from the next isochronous source. In one embodiment, control circuit 307 starts with the first isochronous bandwidth register 207 and sequentially provides the transfer count values to down counter 303 according to whether or not an active request flag from the associated isochronous source is associated with the particular bandwidth register.

Down counter 303 sequentially counts down each isochronous request transfer count value received from multiplexer 305. While down counter 303 is counting down, up/down counter 301 is configured by control circuit 307 as an up counter and counts up. Note that if up/down counter 301 increments for every bit decremented by down counter 303, once down counter 303 has completed sequentially counting all of the isochronous transfer counts from the requesting sources, up/down counter contains an equivalent to the sum produced by ADDER 213. Each time down counter 303 reaches 0, it provides an indication to control circuit 307 which then selects the transfer count of the next source that is requesting to transfer isochronous data on this frame.

Once all of the isochronous transfer requests have been counted, control circuit 307 switches up/down counter to be a down counter. At that time up/down counter 301 decrements for every isochronous transfer on the bus and is compared in comparator 105 to frame counter 103 to determine if the counters ever cross which would force the bus into isochronous priority mode. The compare is not considered valid until up/down counter 301 has been switched to a down counter. Control circuit 307 gates off the compare value until it is considered valid using AND gate 309.

Note that this approach assumes that isochronous transfers take up less than 50% of each frame because there needs to be sufficient time left in the frame to transfer isochronous data after the remaining isochronous transfer count is determined in up/down counter 301.

Under certain conditions the count value in up/down counter 301 at the time control circuit 307 switches up/down counter 301 to be a down counter does not represent the total isochronous transfer count on the bus for that frame. Because isochronous data may be transferred even during asynchronous priority mode, isochronous data may be transferred from one of the isochronous sources while down counter 303 is decrementing and up/down counter 301 would normally be incrementing. To account for this condition, control circuit 307 inhibits the bit clock provided to up/down counter 301 to prevent the remaining isochronous transfer count determined in up/down counter 301 from incrementing while isochronous transfers are taking place. Thus, up/down counter 301 reflects only isochronous transfers remaining to be transferred in the frame, once up/down counter 301 has been switched to be a down counter.

Figure 4:
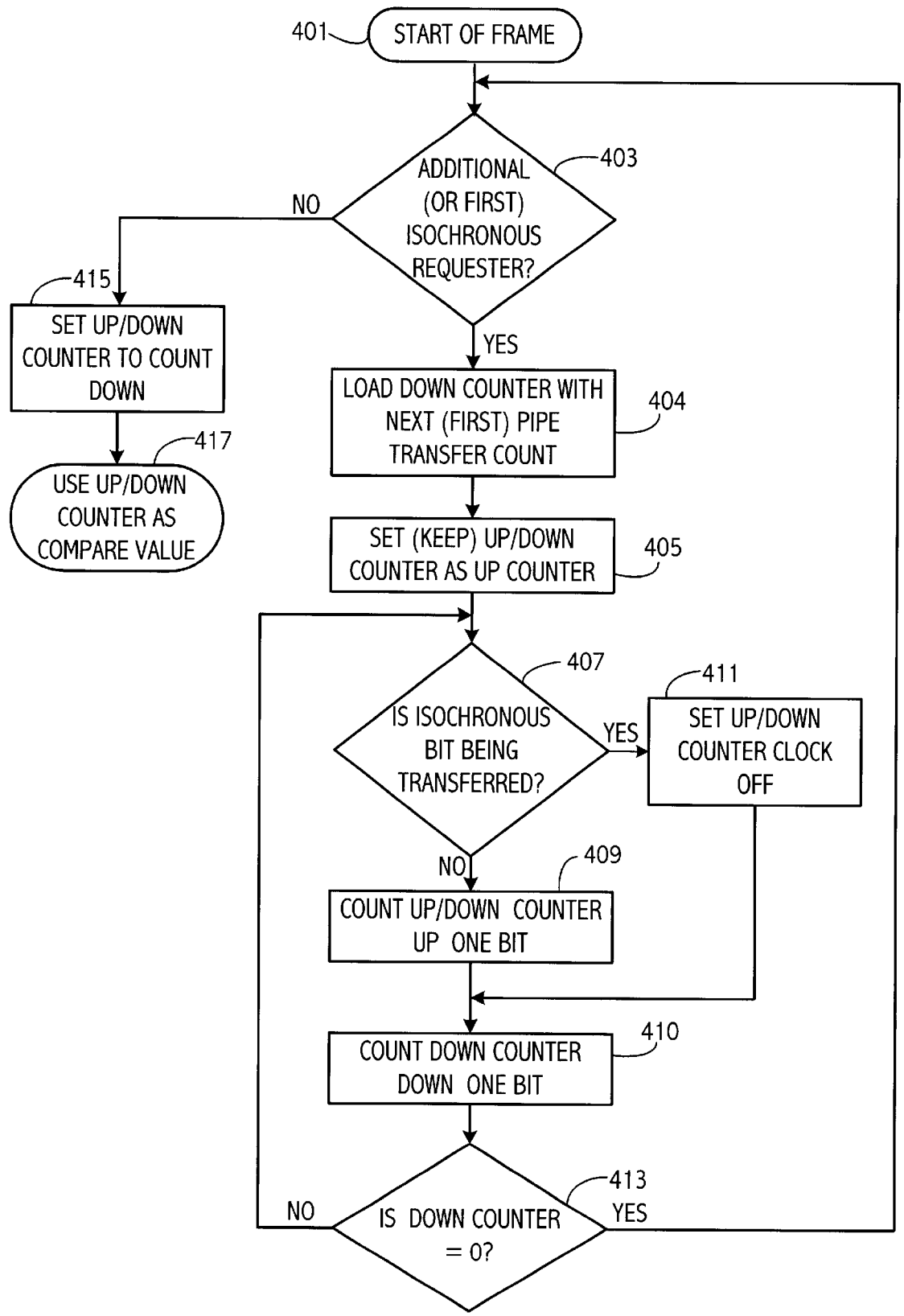
FIG. 4 shows a flow chart of the operation of the system illustrated in FIG. 3.

Referring to FIG. 4, the flow chart shown illustrates operation of an exemplary system utilizing the invention. After the start of each frame 401, control circuit 307 determines in 403 if there are any isochronous requests from any isochronous requesters. If not, the up/down counter is set to count down (or its clock disabled) and the contents in the up/down counter, which should be initialized to zero, can be used to compare to the frame counter. Alternatively, isochronous priority mode can simply be inhibited for the rest of the frame. If there is at least one isochronous requester, the down counter is loaded with the first transfer count value from the first isochronous requester in 404. The up/down counter is configured (or maintained) as an up counter in 405. If an isochronous transfer is taking place on the bus the clock for the up/down counter is turned off for that bit time in step 411. The system then proceeds to step 410. If there are no isochronous transfers taking place, the up/down counter is incremented one bit in step 409.

In step 410, the down counter is decremented and then checked to see if it is zero in 411. If not, steps 407–413 are repeated until the down counter is zero. When the down counter reaches zero, step 403 is repeated to determine if there are any additional isochronous requesters. Then steps 403 through 413 repeat until there are no additional isochronous requesters. At that time, the control circuit configures the up/down counter as a down counter in step 415. The contents of up/down counter 415 are then compared against the contents of the frame time counter (containing the time remaining in the frame), to determine if and/or when the bus should enter isochronous priority mode.

Figure 5:
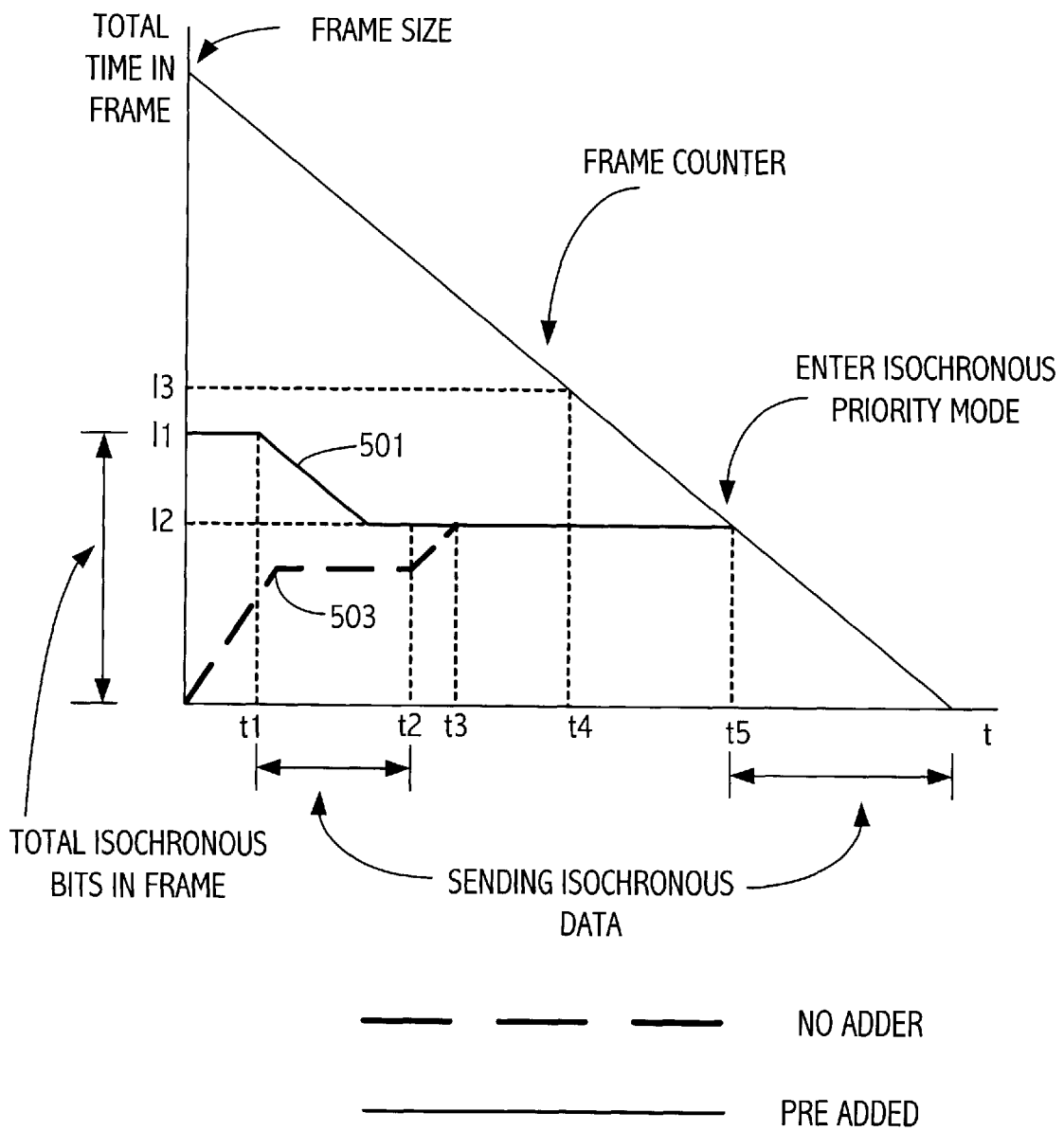
FIG. 5 graphically represents the operation of the dynamic scheduling shown in FIGS. 2–4.

Referring to FIG. 5, the two approaches to dynamic scheduling for isochronous priority mode are described graphically. The total bit time in the frame is shown on the y-axis and time on the x-axis. The bus starts out in asynchronous priority mode. Line 501 represents the embodiment in which ADDER 213 (FIG. 2) provides a sum of all isochronous transfers at the start of the frame. Line 501 starts out at value I1. From time t1 to t2, the bus transfers isochronous data because there were no asynchronous requesters for the bus during that time. That reduces the amount of isochronous data to transfer during the remainder of the frame to I2. Asynchronous transfers resume on the bus at t2 and continue until time t5, when the time remaining in the frame crosses the remaining amount of isochronous data to transfer and the bus enters isochronous priority mode. The graphical depiction in FIG. 5 is idealized in that control logic may provide extra time to transfer isochronous data such that the bus returns to asynchronous priority mode after all isochronous data is transferred. Note that if static scheduling were used, and the maximum allowed isochronous transfers during the frame is assumed to be I3, then the frame enters isochronous priority mode at t4, earlier than the dynamic scheduling would otherwise provide at t5.

Dashed line 503 illustrates the second dynamic approach, which represents the embodiment illustrated in FIGS. 3 and 4. At the start of the frame, the up/down counter contains zero. The up/down counter increments until time t1 when the bus is transferring isochronous data so the up/down counter's clock is inhibited until time t2. At time t2 the bus again transfers asynchronous data at which time the up/down counter again counts up until it reaches the level I2 at time t3 which represents the remaining isochronous data to transfer during the frame. At t3, the up/down counter is configured to count down. If no isochronous transfers had occurred between times t1 and t2, the up/down counter would have counted up to the I1 level. At time t5 the bus enters isochronous priority mode and the up/down decrements for each isochronous transfer on the bus until the end of frame (or all isochronous transfers are complete). Thus, as can be seen in FIG. 5, both dynamic approaches reduce the latency for asynchronous transfers except when the amount of isochronous data to be transferred during a particular frame is at the maximum load value (I3).

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A method for determining an amount of data to transfer over a bus from a plurality of sources during a time period, comprising:

sequentially providing a plurality of numbers to a first counter from respective ones of the sources requesting transfer of data, each of the numbers representing an amount of data to transfer over the bus from the respective ones of the sources during the time period;

sequentially counting the plurality of numbers in the first counter;

selectably incrementing a count value in a second counter when the first counter is counting, to provide a remaining count value indicative of a remaining amount of data to transfer in the time period from the plurality of sources requesting transfer of data during the time period; and wherein the plurality of sources provide data of a first type, the first type being isochronous data and the method further comprises decrementing the remaining count value in the second counter for each isochronous transfer on the bus after the remaining amount of data to transfer has been determined from all sources requesting transfer.

2. The method as recited in claim 1 further comprising:
tracking time remaining in the time period in a third counter; and
comparing the remaining count value to the time remaining in the time period to determine a priority mode on the bus.

3. The method as recited in claim 2 further comprising switching to isochronous priority mode on the bus according to a comparison of the remaining count value and the time remaining in the time period.

4. The method as recited in claim 3 wherein the bus transfers isochronous and asynchronous data.

5. The method as recited in claim 3 wherein selectably incrementing the count value includes:
incrementing the count value when the first counter is counting and no isochronous data is being transferred over the bus; and
not incrementing the count value when isochronous data is being transferred over the bus and the first counter is counting.

6. The method as recited in claim 5 wherein the time period is a frame on the bus having a fixed length and each of the sources provides an indication at the beginning of the frame as to whether they have isochronous data to transfer.

7. A method for determining an amount of data to transfer over a bus from a plurality of sources during a time period, comprising:
sequentially providing a plurality of numbers to a first counter from respective ones of the sources requesting transfer of data, each of the numbers representing an amount of data to transfer over the bus from the respective ones of the sources during the time period;
sequentially counting the plurality of numbers in the first counter;
selectably incrementing a count value in a second counter when the first counter is counting, to provide a remaining count value indicative of a remaining amount of data to transfer in the time period from the plurality of sources requesting transfer of data during the time period; and
wherein sequentially providing and sequentially counting further includes,
loading a first number of the plurality of numbers into the first counter from a first one of the sources requesting transfer of isochronous data;
counting the first counter down to zero;
sequentially loading a next number in the first counter from a next source and counting down to zero until all sources requesting isochronous transfer have been serviced; and
switching the second counter to count down on transfer of isochronous data after all sources requesting transfer of isochronous data have been serviced.

8. An apparatus for determining priority of data transfer over a bus transferring asynchronous and isochronous data comprising:
a plurality of sources providing respective transfer count values indicative of an amount of isochronous data to transfer over a bus during a time period from the respective sources;
a selector circuit coupled to the plurality of sources to selectably provide one of the count values;
a down counter coupled to the selector circuit to sequentially load count values from sources requesting transfer of isochronous data during the time period;
an up/down counter; and
a control circuit coupled to the down counter and the up/down counter and the selector circuit, the control circuit for setting the up/down counter to count up while the down counter is counting, thereby providing a remaining count value indicative of a remaining amount of isochronous data requested to be transferred during the time period from the plurality of sources requesting transfer of isochronous data.

9. The apparatus as recited in claim 8 wherein the control circuit enables the up/down counter to count down after the remaining count value is determined.

10. The apparatus as recited in claim 8 wherein the time period is a frame and wherein transfer of asynchronous data is given priority at the beginning of the frame.

11. The apparatus as recited in claim 10 further comprising:
a remaining frame time counter tracking time remaining in the frame;
a comparator coupled to the up/down counter and the remaining frame time counter, providing an indication of a comparison of the up/down counter and the remaining frame time counter.

12. The apparatus as recited in claim 9 wherein the control circuit is coupled to a zero indication from the down counter, the control circuit loading up a next sequential transfer count value into the down counter from a next source requesting transfer of data when the zero indication is asserted.

13. The apparatus as recited in claim 8 wherein the control circuit inhibits the up/down counter from incrementing when the down counter is counting and isochronous data is being transferred on the bus from one of the sources.

14. The apparatus as recited in claim 8 further comprising:
a processor module including a central processing unit, the processor module being coupled to the bus; and
an input/output module providing an interface between the processor module and a plurality of input/output functions, the input/output module being communicatively coupled to the processor module via the bus.

15. The apparatus as recited in claim 14 wherein the sources are located on at least one of the input/output module and the processor module.

16. An apparatus for determining priority on a bus transferring isochronous and asynchronous data in one of asynchronous and isochronous priority mode, comprising:
a plurality of sources providing transfer count values indicative of an amount of isochronous data to transfer on the bus during a frame;

a selector means for receiving the transfer count values and selectably transferring the transfer count values;

a first means receiving the transfer count values for sequentially counting down each of the transfer count values;

a second means for selectably counting up while the first means is counting down to determine a remaining count value of isochronous data to be transferred during the frame; and control means for controlling the selector means to provide the first means with each of the transfer count values and for controlling the second means to count up while the first means is counting down and no isochronous data is being transferred from one of the sources on the bus.

17. The apparatus as recited in claim 16 wherein the second means is configured to count down for isochronous transfers on the bus once the first means has completed sequentially counting each of the transfer count values.

* * * * *